United States Patent [19]

Kito et al.

[11] Patent Number: 4,975,736

[45] Date of Patent: Dec. 4, 1990

[54] METHOD OF STORING FRAME INFORMATION

[75] Inventors: Eiichi Kito; Makio Hirata, both of Kanagawa, Japan

[73] Assignee: Fuji Photo Film Co., Ltd., Kanagawa, Japan

[21] Appl. No.: 379,138

[22] Filed: Jul. 13, 1989

[30] Foreign Application Priority Data

Jul. 20, 1988 [JP] Japan .................................. 63-181391
Jul. 20, 1988 [JP] Japan .................................. 63-181394

[51] Int. Cl.$^5$ ............................................. G03B 27/32
[52] U.S. Cl. ........................................ 355/77; 355/35; 355/39; 355/40; 355/41
[58] Field of Search ................. 355/35, 39, 40, 41, 355/77

[56] References Cited

U.S. PATENT DOCUMENTS

| | | | |
|---|---|---|---|
| 4,260,244 | 4/1981 | Laska et al. ........................... | 355/35 |
| 4,294,537 | 10/1981 | Laska et al. ........................... | 355/35 |
| 4,432,637 | 2/1984 | Baschung .............................. | 355/35 |
| 4,577,956 | 3/1986 | Klosterhuber et al. ............... | 355/40 |
| 4,607,949 | 8/1986 | Hakamada et al. ................... | 355/40 |

FOREIGN PATENT DOCUMENTS

56-128932 10/1981 Japan .
56-128933 10/1981 Japan .

Primary Examiner—Monroe H. Hayes
Attorney, Agent, or Firm—Sughrue, Mion, Zinn, Macpeak & Seas

[57] ABSTRACT

A method of printing exposed photographic film, comprises the steps of: storing on a first storage medium frame information containing at least the exposure information on, and the frame number of, exposed photographic film; printing an image from the photographic film into photographic paper on the basis of the exposure information stored on the first storage medium; and storing the aforesaid frame information on a second storage medium in the printing order of the printed image frame. Accordingly, the image printed on the photographic paper correctly corresponds to the frame information associated with this image.

18 Claims, 6 Drawing Sheets

METHOD OF STORING FRAME INFORMATION

BACKGROUND OF THE INVENTION

1. Field of the Invention

The present invention relates to a method of printing exposed photographic film.

2. Description of the Related Art

In general, photographic film which has been exposed is subjected to a so-called simultaneous printing process in which the photographic film is developed and printed at the same time. If a consumer orders extra printing, he looks for a frame number corresponding to the desired print while viewing his negative film and gives an order by specifying the frame number. However, if similar images are continuously recorded on the negative film, the consumer will find it difficult to look for the desired image corresponding to the frame number to be specified and may give a wrong order occasionally.

To cope with the above-described problem, it has heretofore been proposed to provide a photographic printing apparatus with a character printer so that a frame number corresponding to each image of negative film is printed on photographic paper (as disclosed in, for example, Japanese Patent Laid-Open Nos. 128932/1981 and 128933/1981). In accordance with such a proposal, since a frame number is printed on the reverse surface of each sheet of photographic paper, it is possible to easily specify a desired frame number at the time of the order. Moreover, if the amount of exposure correction for printing is printed together with each corresponding frame number, it is also possible to produce an extra print the finish of which is substantially the same as the finish of the initial print produced by a simultaneous printing process. Such a frame number and the amount of exposure correction are hereinafter referred to simply as the frame information.

The above-described character printer is commonly of the dot-impact type and, particularly in the case of a high-speed character printer, the breakage of a latent image, hence, desensitization, may take place due to the striking pressure of a printing head in a character-printing section. If the character printer is of a type which does not apply any pressure to photographic paper, for example, an ink-jet type or a heat transfer type, the problem described above may be eliminated, but the printing speed is limited. In addition, the maintainability is inferior and a number of consumable goods such as ink ribbon, ink and the like are required, thus leading to an increase in cost.

For these reasons, it is considered that characters are printed on the reverse surface of photographic paper after the photographic paper has been processed. This is because, after processing, there is no risk that a change may occur in an image on the surface of the photographic paper, and also because, even if a character printer of the dot-impact type is employed, it is possible to avoid the problem of the breakage of a latent image. In this case, the frame information to be printed on photographic paper is generally read from a paper tape which stores the exposure conditions of the corresponding negative film, and the character printer is controlled on the basis of the frame information thus read.

In such a character printing process, however, a number of problems may be experienced, particularly in a case where printing is effected by utilizing control negative film irrespective of information stored on paper tape or where negative film and paper tape need to be fed back to conduct printing once more due to accidents such as fluctuations in synchronization or the jamming of the negative film.

In such a case, a discrepancy may occur between the sequence of frames stored on the paper tape and the sequence of image frames recorded on roll photographic paper. If frame information is printed on the reverse surface of the photographic paper in accordance with the sequence of frames initially stored on the paper tape, the frame information printed will not correspond to the original image.

SUMMARY OF THE INVENTION

It is, therefore, an object of the present invention to provide a method of printing exposed photographic film, which is capable of storing frame information on photographic film properly in the order of image frames printed on photographic paper.

To this end, a method of printing exposed photographic film in accordance with the present invention comprises a first storing step of storing on a first storage medium frame information containing at least the exposure information on, and the frame number of, the exposed photographic film, the printing step of printing an image from the photographic film onto photographic paper on the basis of the exposure information stored on the first storage medium, and a second storing step of storing the aforesaid frame information on a second storage medium so that the printing order of the printed frame can be confirmed.

In accordance with the present invention, since the frame information stored on the first storage medium is restored on the second storage medium in accordance with the printing order of printed frames, it is possible to make the images printed on the photographic paper correctly correspond to the frame information associated with the respective images. That is to say, it is possible to store the frame information on the photographic film properly.

In one preferred form of the present invention, not only the above frame information but the amount of feeding of photographic paper may be stored on the second storage medium and, during postprocessing, the printed photographic paper may be fed under control based on the amount of feeding stored on the second storage medium.

Accordingly, while the printed photographic paper is being fed during postprocessing, for example, in a case where frame information on each image frame is printed on a corresponding image-frame portion of the photographic paper, the photographic paper is fed and stopped on the basis of the amount of feeding stored on the second storage medium and, therefore, the photographic paper can be properly fed without any discrepancy between the image frames and the corresponding frame information by reading out the amount of feeding and the frame information stored together.

DESCRIPTION OF THE PREFERRED EMBODIMENTS

Figure 1:
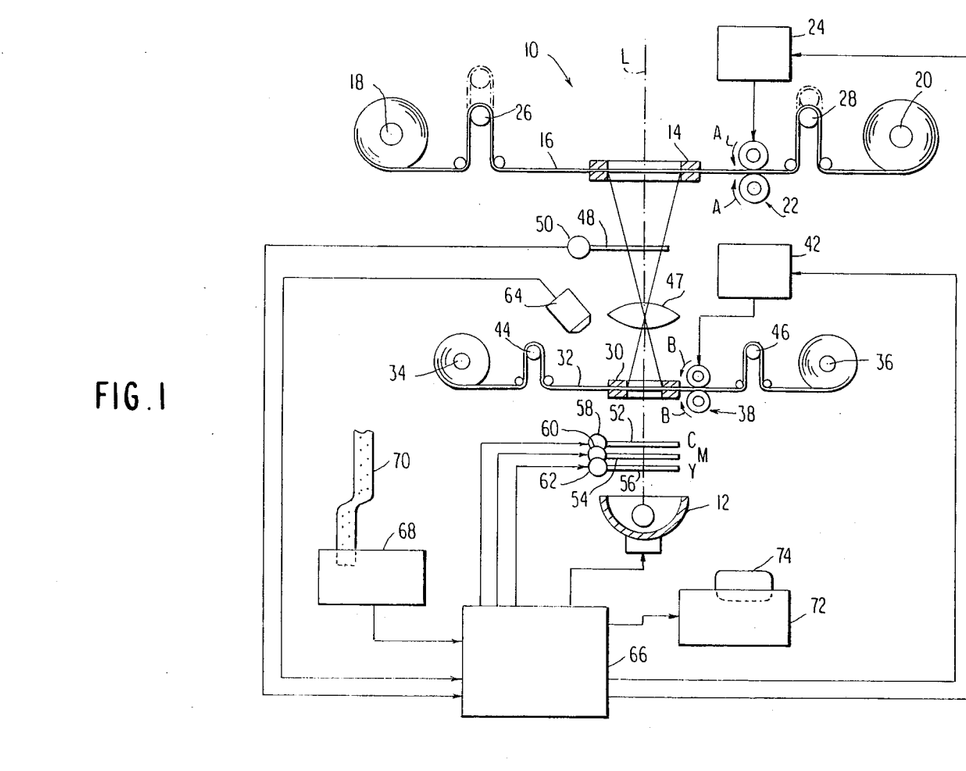
FIG. 1 is a schematic block diagram showing the construction of a photographic printing apparatus to which a first embodiment of the present invention is applied.

FIG. 1 shows a photographic printing apparatus 10 according to a first embodiment of the present invention. A printing mask 14 is disposed at the uppermost position on a printing optical path L of light rays emitted from a light source 12 of the photographic printing apparatus 10. The printing mask 14 clamps an intermediate portion of roll-like photographic paper 16 so as to hold the intermediate portion in printing position. The roll-like photographic paper 16 is wound around rotary shafts 18 and 20 at its opposite ends in the form of a roll. A pair of feed rollers 22 are disposed downstream of the printing mask 14 so as to clamp the photographic paper 16. Each of the feed rollers 22 is rotated by the driving force of a motor 24 in the direction indicated by a corresponding arrow A in FIG. 1 so that the leading end of the photographic paper 14 is supplied from the outer circumferential portion of a roll portion located on one side (the roll portion on the left side as viewed in FIG. 1) and is in turn wound around the rotary shaft 20 on the other side.

A portion of the photographic paper 16 positioned between the rotary shaft 18 on the supply side and the printing mask 14 is wound around a tension roller 26. Another tension roller 28 is disposed downstream of the feed rollers 22, and a portion of the photographic paper 16 positioned between the feed rollers 22 and the rotary shaft 20 is wound around this tension roller 28. These tension rollers 26 and 28 are arranged for movement in the directions perpendicular to the respective axes so as to keep constant the tension of the photographic paper 16 which is being fed.

A negative mask 30 is disposed on the printing optical path L at a location below the printing mask 14. The negative mask 30 clamps an intermediate portion of lengthy negative film 32 to hold it in a predetermined position. The negative film 32 is wound around rotary shafts 34 and 36 at both ends in the form of a roll. A pair of feed rollers 38 is disposed downstream of the negative mask 30 so as to clamp a portion of the negative film 32. Each of the feed rollers 38 is rotated by the driving force of a motor 42 in the direction indicated by a corresponding arrow B in FIG. 1 so that the leading end of the negative film 32 is fed from the outer circumferential portion of a roll portion located on one side (the roll portion on the left side as viewed in FIG. 1) and is in turn wound around the rotary shaft 36 on the other side.

A portion of the negative film 32 positioned between the rotary shaft 34 on the supply side and the negative mask 30 is wound around a tension roller 44. Another tension roller 46 is disposed downstream of the feed rollers 38, and a portion of the negative film 32 positioned between the feed rollers 38 and the rotary shaft 36 is wound around this tension roller 46. These tension rollers 44 and 46 are arranged for movement in the directions perpendicular to the respective axes so as to keep constant the tension of the negative film 32 which is being fed.

A printing lens 47 and a black shutter 48 are disposed along the printing optical path L between the negative mask 30 and the printing mask 14. The black shutter 48 is arranged so that it can move into and out of the printing optical path L in response to a drive signal supplied from a driver 50. Cut-filters 52, 54 and 56, which correspond to C (cyan), M (magenta) and Y (yellow), respectively, are disposed between the negative mask 30 and the light source 12 along the printing optical path L. These cut-filters 52, 54 and 56 are arranged such that they can move into and out of the printing optical path L in response to drive signals supplied from drivers 58, 60 and 62, respectively.

A photosensor 64 is disposed obliquely above the negative mask 30. The photosensor 64 serves to detect density information on an image formed by exposure on the portion of the negative film 32 which is held in position by the negative mask 30, and then to supply the detected value to a control section 66. The control section 66 computes the amount of exposure on the basis of the density information, and provides control over the black shutter 48 and the cut-filters 52, 54 and 56 in accordance with the result of this computation.

A paper-tape reader 68 is connected to the control section 66 and is arranged so as to accommodate paper tape 70 which serves as a first storage medium.

Information is recorded on the paper tape 70 in the following manner. After the negative film 32 has been prepared by processing exposed photographic film, this negative film 32 is loaded into a printer. The printer feeds the negative film 32 while setting various information on each frame, such as the exposure conditions thereof. During this setting operation, feeding of the paper tape 70 is performed in sychronization with the feeding of the negative film 32, and this paper tape 70 is punched with holes which represent various kinds of information on each frame, such as a frame number and exposure conditions. In this manner, the frame numbers, the exposure conditions and so on are stored on the paper tape 70.

The paper-tape reader 68 is arranged to read out information, such as a frame number, stored on the paper tape 70 and to supply it to the control section 66. Sort marks which represent the frame numbers of the negative film 32 and splices in units of orders are stored in advance on the paper tape 70 in a first storing step. The sort marks are sequentially read from the paper tape 70 by the paper-tape reader 68 in synchronization with the feeding of the negative film 32.

A memory-card writer 72 is connected to the control section 66. The memory-card writer 72 is capable of accommodating a memory card 74, such as an ID card, which serves as a second storage medium. The control section 66 is arranged to store on the memory card 74 the frame numbers and the exposure correction data for a printing process which have been stored on the paper tape 70. In this manner, information synchronized with the sequence of steps in a printing process is stored on the memory card 74. This memory card 74 is used in combination with a character printer which will be explained below.

Figure 2:
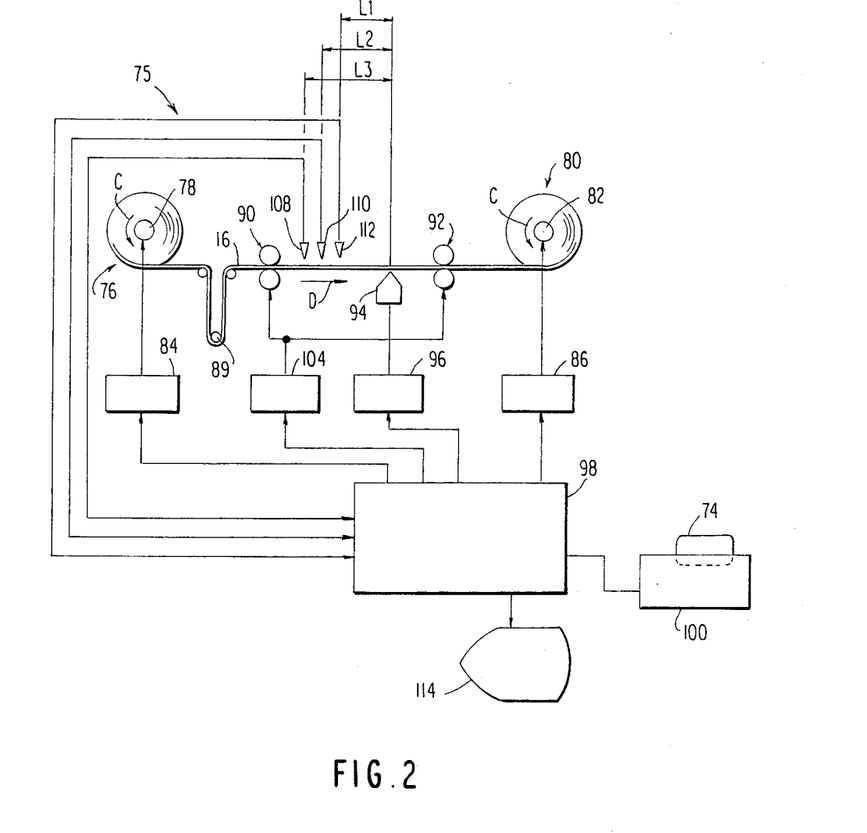
FIG. 2 is a schematic block diagram showing the construction of a character printer to which the first embodiment is applied.

As shown in FIG. 2, the character printer 75 is disposed downstream of the photographic printing apparatus 10 with a processor (not shown) (an apparatus for effecting development, fixation, washing and drying of photographic paper) interposed therebetween.

The photographic paper 16 which has been processed is rolled around a rotary shaft 78 in a supplying section 76. The leading end of the photographic paper 16 is supplied from the outer circumferential portion of the roll of the photographic paper 16, and is wound around a rotary shaft 82 in a winding section 80. The rotary shaft 78 in the supplying section 76 and the rotary shaft 82 in the winding section 80 are rotated by the driving forces of motors 84 and 86, respectively, in the directions indicated by arrows C in FIG. 2. In this manner, the photographic paper 16 is fed in the direction indicated by an arrow D in FIG. 2.

The printer 75 is provided with a tension roller 89, two pairs of driving rollers 90 and 92, and a printing head 94 disposed between the rollers 90 and 92. The printing head 94 is disposed so as to oppose the reverse surface of the photographic paper 16, and is connected to the control section 98 via a head driver 96. The control section 98 is arranged to read frame information stored on the memory card 74 through a memory-card reader 100 which will be described later, and then to control the head driver 96 to actuate the printing head 94.

The driving rollers 90 and 92 are each rotated by the driving force of a motor 104 so as to feed the photographic paper 16 while clamping it therebetween. A cut-mark sensor 108, a sort-mark sensor 110, and a paper-splice sensor 112 are respectively disposed at distances L3 and L1 from the printing head 94, and the signal lines leading from the respective sensors are connected to the control section 98.

The memory-card reader 100 is arranged to accommodate the memory card 74 on which frame information has been stored by means of the memory-card writer 72 of the photographic printing apparatus 10. Accordingly, the cut-mark sensor 108, the sort-mark sensor 110, and the paper-slice sensor 112 can detect corresponding marks to make a desired image on the photographic paper 16 correspond to particular frame information such as a frame number and exposure correction data. This frame information can be printed by the printing head 94.

A display section 114 for displaying frame information read through the memory-card reader 100 is also connected to the control section 98.

The operation of the first embodiment will be explained below.

Figure 3:
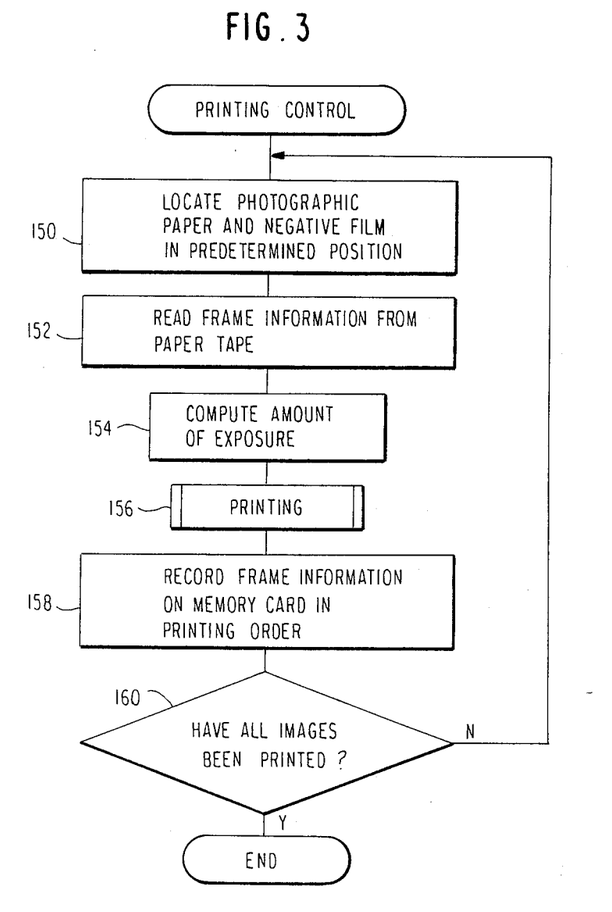
FIG. 3 is a flow chart showing the printing control routine used in the first embodiment.

First of all, printing control is explained in accordance with the flow chart of FIG. 3. In the following description, it is assumed that, in the first storing step, frame information such as the frame number of each image frame is stored on the paper tape 70 and that this paper tape 70 is loaded in the paper-tape reader 68.

In Step 150, the photographic paper 16 and the negative film 32 are fed so that a particular portion of the photographic paper 16 and a desired frame of the negative film 32 are located in predetermined positions in the printing mask 14 and the negative mask 30, respectively. Then, in Step 152, corresponding frame information is read from the paper tape 70 through the paper-tape reader 68. In Step 154, the amount of exposure is computed from a detection signal supplied from the photosensor 64 and the above frame information. This amount of exposure is determined for each color.

In Step 156, the control section 66 controls the movement of the black shutter 48 and the cut-filters 52, 54 and 56 on the basis of the computed amount of exposure and execute printing In this manner, light rays emitted from the light source 12 are transmitted through the desired frame of the negative film 32 and the transmitted image is printed on the particular portion of the photographic paper 16.

After the printing has been completed, the process proceeds to Step 158, in which the exposure correction data and the frame number, which correspond to this printed image, are stored on the memory card 74 by the memory-card writer 72. If imperfect printing results for one cause or another, and if it is necessary to immediately carry out printing from the identical negative image, the photographic paper 16 alone is fed by a predetermined amount (by one frame) so as to conduct printing again. In such a case, the same frame information is stored on the memory card 74 twice continuously. Even if control negative film is used to effect printing irrespective of the frame information stored on the paper tape 70, information on the control negative film (a number or a symbol indicative of the control negative film) is stored on the memory card 74. With respect to an image frame printed in place of an imperfect image frame or an image frame printed by using the control negative film, a symbol indicative of no necessity for printing together with the requisite frame information is stored on the memory card 74.

In Step 160, it is determined whether or not the entire printing process for the desired frame of the negative film 32 has been completed. If it has not, the process returns to Step 150 and the above-described steps are repeated.

The photographic paper 16 which has been passed through the printing step is fed to the processor for effecting the steps of development, fixation, washing and drying. After these steps have been completed, the photographic paper 16 is set in the character printer 75. Now, control of character printing in the character printer 75 will be explained with reference to the flow chart of FIGS. 4(A) and 4(B).

Figures 4A, 4B:
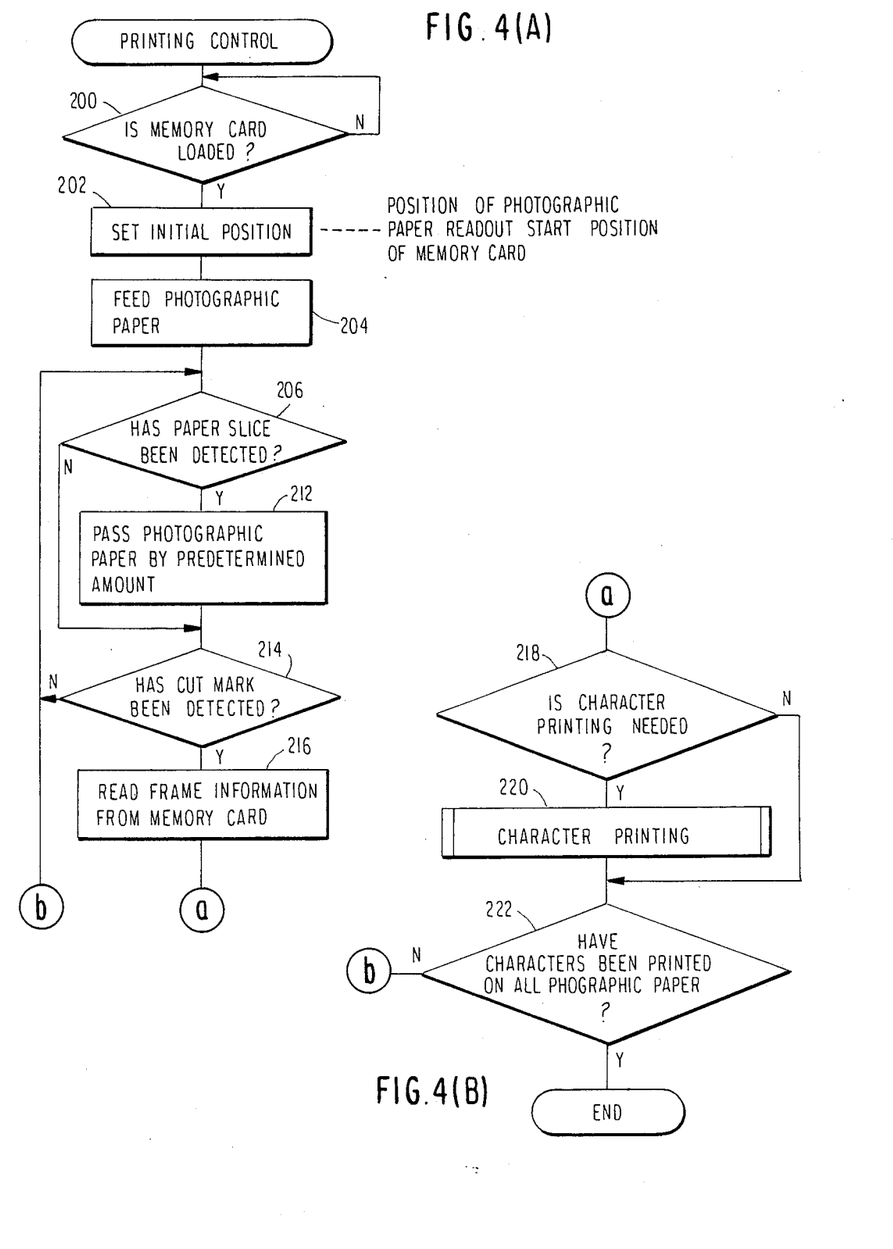
FIGS. 4(A) and 4(B) are a flow chart showing the character-printing control routine executed in the first embodiment.

First, the roll-like photographic paper 16 is set on the rotary shaft 78 in the supplying section 76, and the leading end of the photographic paper 16 is supplied from the outer circumferential portion of the roll thereof and is then wound around the rotary shaft 82 in the winding section 80. This operation may be manually performed.

In Step 200, whether or not the memory card 74 has been loaded into the memory-card reader 100 is checked. In Step 202, the initial position of the photographic paper 16 and the readout start position of the memory card 74 are initialized. In Step 204, feeding of the photographic paper 16 is started. When the feeding of the photographic paper 16 is started, whether or not a paper slice mark has been detected is determined in Step 206. If an affirmative decision is made, the photographic paper 16 is made to pass by a predetermined amount in Step 212, and the process proceeds to Step 214. If a negative decision is made in Step 206, the process jumps over Step 212 to Step 214.

In Step 214, whether or not a cut mark or mark attached to each frame on the photographic paper 16 has been detected is determined. If no cut mark is detected, the process proceeds to Step 206, in which the above-described steps are repeated. If an affirmative decision is made in Step 214, corresponding frame information is read from the memory card 74 in Step 216. Then, the process proceeds to Step 218, where it is determined whether or not the relevant image is an image of the type with respect to which characters need to be printed. Such a decision can be made by detecting a symbol indicative of no necessity for printing since such a symbol together with the requisite frame information is stored with respect to an image frame printed in place of an imperfect image frame or printed by using a control negative film.

If it is determined, in Step 218, that printing of characters is needed, the process proceeds to Step 220, in which the process of printing characters is executed. Then, the process proceeds to Step 222, in which it is determined if the characters have been printed with respect to all the image frames on the photographic paper 16. If a negative decision is made in Step 222, the process returns to Step 206, whereas, if an affirmative decision is made, the above character-printing control is completed.

A second embodiment will be described below with reference to FIGS. 5, 6(A) and 6(B).

The photographic printing apparatus used in the second embodiment is substantially identical to that used in the first embodiment and the following explanation is therefore given, as required, referring to FIG. 1.

Figure 5:
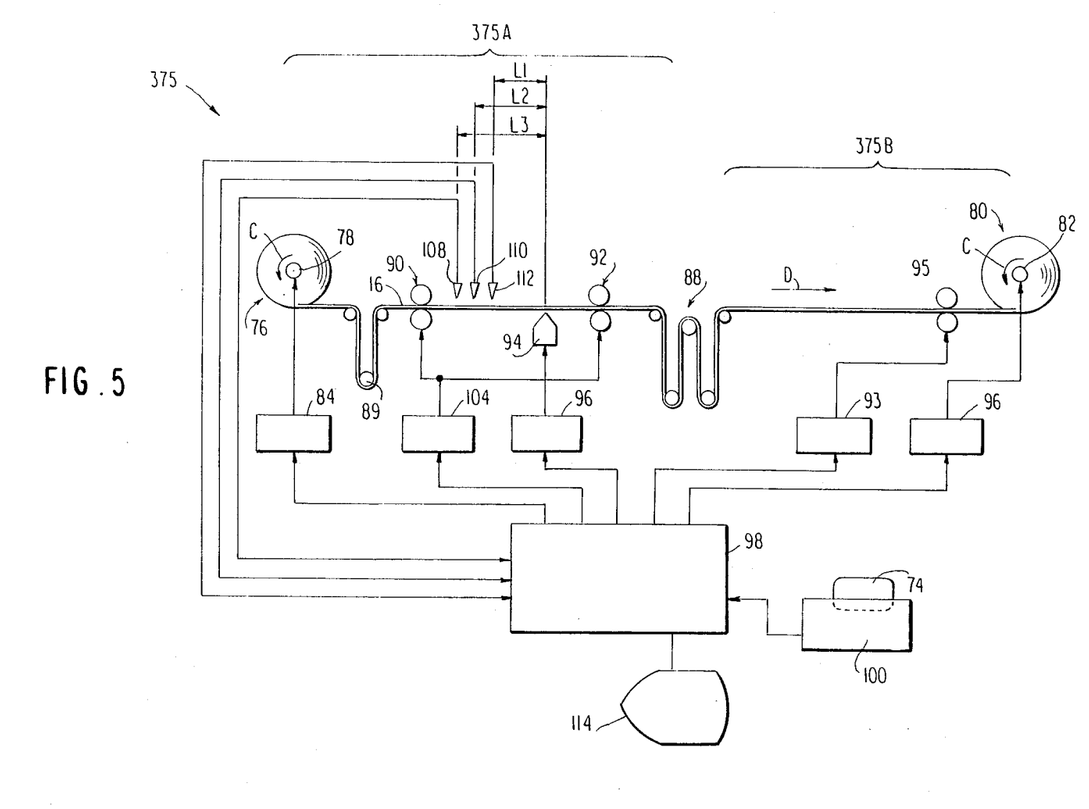
FIG. 5 is a schematic block diagram showing the construction of an inspector to which a second embodiment of the present invention is applied.
Figures 6A, 6B:
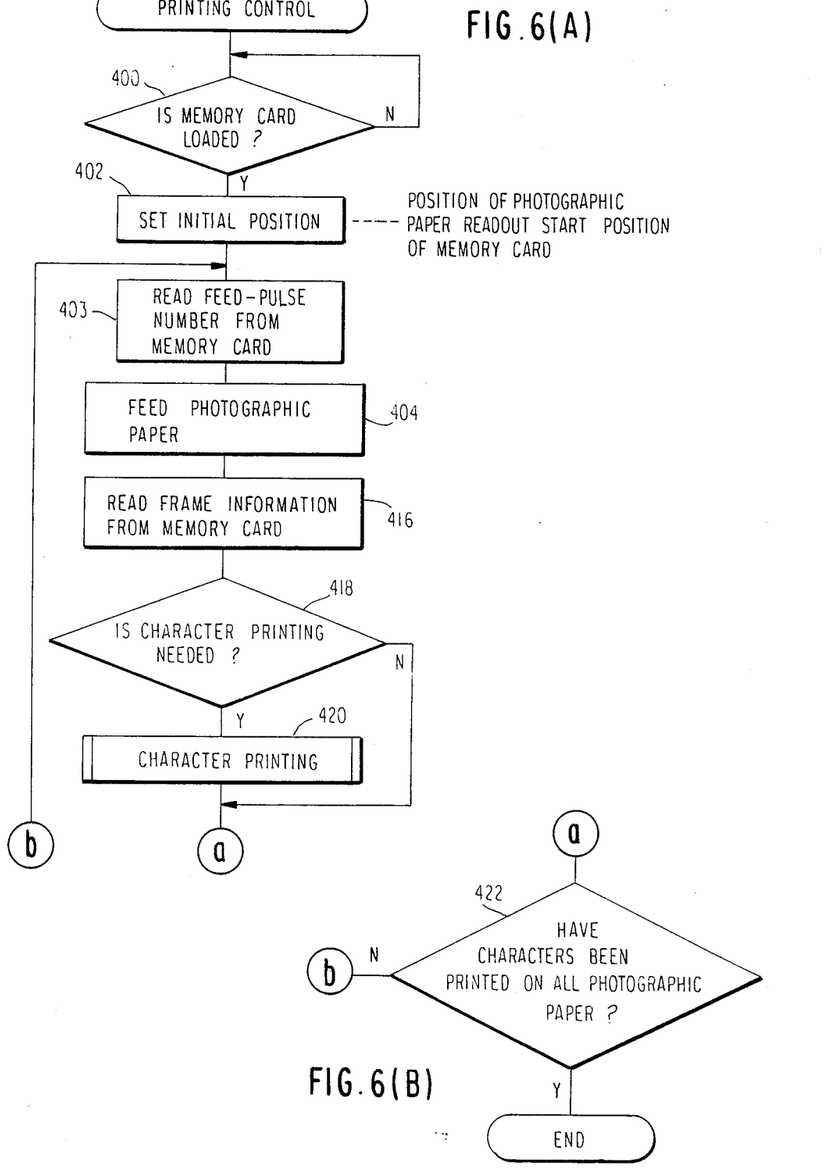
FIGS. 6(A) and 6(B) are a flow chart showing the printing control routine executed in the second embodiment.

In the second embodiment, an inspector, shown as reference numeral 375 in FIG. 5, is used in place of the character printer 75 of the first embodiment.

The second embodiment is arranged so that the pulse number of the motor 24 (for feeding the photographic paper 16) controlled by the control section 66 is stored in the memory card 74 loaded in the memory-card writer 72.

Although the feed-pulse number of the motor 24 is normally fixed for each frame, the feed-pulse number may change in a case (1) where a slice of the photographic paper 16 appears during continuous printing and an area including the slice is fed without printing, (2) where a predetermined amount of preliminary feeding is carried out at the time of updating of each lot in order to identify the negative film 32 in units of lots, (3) where a deviation in frame number occurs when a control negative film is used to effect printing irrespective of information stored on the paper tape 70, or (4) where, when fluctuations in synchronization or the jamming of the negative film 32 take place, the negative film 32 and the paper tape 70 are fed back and the same image is again printed.

To cope with the above-described cases, the control section 66 controls the memory-card writer 72 to sequentially store on the memory card 74 the feed-pulse number of the photographic paper 16 which is actually fed and stopped. In addition, frame numbers and exposure correction data for a printing process, that have been stored on the paper tape 70 that is identical to the paper tape used in the first embodiment, are stored on the memory card 74 in correspondence with each feed-pulse number. In this manner, information synchronized with the sequence of steps in a printing process is stored on the memory card 74. This memory card 74 is used in combination with the inspector 375, which will be described later.

Since the inspector 375 has a construction similar to that of the character printer 75 of the first embodiment, the same reference numerals are used to denote the elements which are the same as those used in the character printer 75 and the description thereof is omitted.

As in the case of the character printer 75 of the first embodiment, the inspector 375 is disposed, as shown in FIG. 5, downstream of the photographic printing apparatus 10 with a processor (not shown) (an apparatus for effecting development, fixation, washing and drying of photographic paper) interposed therebetween.

The front stage of the inspector 375 is arranged as a printing section 375A for printing frame information on the reverse surface of the photographic paper 16, while the rear stage of the inspector 375 is arranged as an inspecting section 375B for inspecting an image developed on the photographic paper 16. A tension-roller group 88 is disposed between the printing section 375A and the inspecting section 375B, and the photographic paper 16 is wound around the tension-roller group 88 in a staggered manner. The action of the tension-roller group 88 is utilized to absorb the difference in feed speed between the printing section 375A and the inspecting section 375B.

In the inspecting section 375B, a photographic-paper stage (not shown) is disposed downstream of the tension-roller group 88 in the direction of paper feed. The inspecting section 375B is arranged so that an operator visually inspects the state of each image formed on the photographic paper 16 placed on the photographic-paper stage and so that, if the operator determines that a particular image is imperfect, an NG mark can be attached to the imperfect image on the photographic paper 16. Downstream of the photographic-paper stage (not shown), a pair of driving rollers 95 is disposed, the rotation of which is controlled by a control section 98. The photographic paper 16, which is clamped between the driving rollers 95, is fed to the winding section 80 by the driving rollers 95.

As in the first embodiment, the memory-card reader 100 is arranged to accommodate the memory card 74 on which frame information has been stored by means of the memory-card writer 72 of the photographic printing apparatus 10 described above. Accordingly, the feed-pulse number stored on the memory card 74 is synchronized with the amount of actual feed in the inspector 375 (which is determined from the detection results provided by the cut-mark sensor 108, the sort-mark sensor 110, and the paper-slice sensor 112 ) so that a desired image on the photographic paper 16 can be made to correspond to particular frame information such as a frame number and exposure correction data. A display section 114 for displaying frame information read through the memory-card reader 100 is also connected to the control section 98.

The following is a description of the operation of the second embodiment.

First of all, printing control will be explained. The flow chart of the printing control in the second embodiment is substantially identical to the flow chart, shown in FIG. 3, used for explanation of the first embodiment. Accordingly, the following explanation is centered on only the portion which differs from the printing control in the first embodiment.

The flow from Step 150 to Step 156 is common to the first and second embodiments.

In Step 158, exposure correction data and a frame number, which correspond to the image printed in Steps 150 to 156, are stored on the memory card 74 by the memory-card writer 72. If imperfect printing results for one cause or another, and if it is necessary to immediately carry out printing from the identical negative image, the photographic paper 16 alone is fed by a predetermined amount (by one frame) so as to conduct printing again. In such a case as well, corresponding frame information is sequentially stored on the memory card 74. Even if control negative film is used to effect printing irrespective of frame information stored on the paper tape 70, information on the control negative film (a number or a symbol indicative of the control negative film) is stored on the memory card 74. The control section 66 controls the memory-card writer 72 to store the feed-pulse number on the memory card 74. If a slice is detected in the photographic paper 16, the feed-pulse number counted during feeding without printing is also stored on the memory card 74.

Step 160 is the same as that explained in conjunction with the first embodiment.

In this manner, the pulse number which is equivalent to the times of feeding and stoppage of the photographic paper 16 can be sequentially stored on the memory card 74, whereby the operator can grasp the sequence of printing The photographic paper 16 which has been passed through the printing step is fed to the processor for effecting the steps of development, fixation, washing and drying. After these steps have been completed, the photographic paper 16 is set in the inspector 375. Now, control of character printing in the inspector 375 will be explained with reference to the flow chart of FIGS. 6(A) and 6(B).

First, the roll-like photographic paper 16 is set on the rotary shaft 78 in the supplying section 76, and the leading end of the photographic paper 16 is supplied from the outer circumferential portion of the roll thereof and is then wound around the rotary shaft 82 in the winding section 80. This operation may be manually performed.

In Step 400, it is checked whether or not the memory card 74 has been loaded into the memory-card reader 100. In Step 402, the initial position of the photographic paper 16 and the readout start position of the memory card 74 are initialized. In Step 403, the feed-pulse number is read from the memory card 74 and, in Step 404, feeding of the photographic paper 16 is started on the basis of the feed-pulse number thus read. In Step 416, corresponding frame information is read from the memory card 74. Then, the process proceeds to Step 418, where it is determined whether or not the relevant image is an image of the type with respect to which characters need to be printed. Such a decision can be made on the basis of the frame information read from the memory card 74 since no character needs to be printed with respect to an image frame printed from the control negative film. If it is determined, in Step 418, that printing of characters is needed, the process proceeds to Step 420, in which the process of printing characters is executed. Then, the process proceeds to Step 422, in which it is determined whether the characters have been printed with respect to all the image frames on the photographic paper 16. If a negative decision is made in Step 422, the process returns to Step 403, whereas, if an affirmative decision is made, the above character-printing control is completed.

As described above, in the second embodiment, the sequence of printing and the amount of feeding without printing in the photographic printing apparatus 10 are stored on the memory card 74 directly as a feed-pulse number and, in a character-printing process, feeding of the photographic paper 16 is effected in synchronization with the information stored on the memory card 74. Accordingly, no different frame number or exposure information is printed on the reverse surface of a particular frame portion of the photographic paper 16, and it is therefore possible to achieve exact printing of frame information.

In each of the first and second embodiments, the paper tape 70 is employed as the first storage medium and the memory card 74 as the second storage medium, but a single memory card 74 may be used in common as the first and second storage media. In this case, in place of the tape reader 68 and the memory-card writer 72, a memory card reader/writer needs to be provided in the photographic printing apparatus 10.

In the second embodiment, feed control for postprocessing of the photographic paper 16, which is provided by utilizing the memory card 74, is used in the inspector 375. However, the memory card 74 may be utilized for the feed control required to conduct other kinds of postprocessing, for example, the processing executed in a cutter/sorter for cutting photographic paper into individual image-frame sheets and sorting them for each order.

What is claimed is:

1. A method of printing exposed photographic film, comprising the steps of:
   (a) storing on a first storage medium frame information containing at least exposure information on and the frame number of exposed photographic film;
   (b) printing an image from said exposed photographic film onto photographic paper on the basis of said exposure information stored on said first storage medium;
   (c) storing on a second storage medium said frame information and information indicating whether it is necessary to print character information on said photographic paper of said printed image so that the printing order of said printed image frame can be confirmed; and
   (d) printing a character on said photographic paper on which said image has been printed in response to said information stored on said second storage medium.

2. A method of printing exposed photographic film according to claim 1, wherein said first storage medium and said second storage medium are mutually different types of storage media.

3. A method of printing exposed photographic film according to claim 1, wherein said first storage medium and said second storage medium are identical types of storage media.

4. A method of printing exposed photographic film according to claim 1, wherein said step (d) is executed on the basis of said information stored on said second storage medium in said step (c).

5. A method of printing exposed photographic film according to claim 4, wherein, in said step (d), whether or not said process of printing a character is required is determined for each individual image printed on said photographic paper on the basis of said information stored on said second storage medium; if it is determined that said process of printing a character is required with regards to a particular image, said process is executed with respect to only said particular image.

6. A method of printing exposed photographic film according to claim 1, wherein not only said frame information and said character printing information is stored in said second information storing step (c), but additionally storing on said second storage medium in said second information storing step (c) feed information as to the amount of said photographic paper which is fed in said image printing step (b) in correspondence with each image frame of said exposed photographic film.

7. A method of printing exposed photographic film according to claim 6, further comprising a postprocessing feed control step (e) effecting feeding of said printed photographic paper and postprocessing of said printed photographic paper while controlling the feeding of said printed photographic paper on the basis of said feed information as to the amount of feeding carried out in image printing step (b) and stored on said second storage medium in said second information storing step (c).

8. A method of printing exposed photographic film according to claim 7, wherein said first storage medium and said second storage medium are mutually different types of storage media.

9. A method of printing exposed photographic film according to claim 7, wherein said first storage medium and said second storage medium are identical types of storage media.

10. A method of printing exposed photographic film according to claim 7, wherein said step (e) includes step (d).

11. A method of printing exposed photographic film according to claim 7, wherein, in said character printing step (d), determining whether it is necessary to execute said character printing step (d) for each individual image printed on said photographic paper on the basis of said character printing information stored on said second storage medium in said second information storing step (c) so that said character printing step (d) is executed with respect to only those printed images which required it.

12. A method of printing exposed photographic film according to claim 7, wherein an image of each image frame of said exposed photographic film is printed on said photographic paper while said photographic paper is being intermittently fed, the amount of feeding of said photographic paper being stored on said second storage medium as a feed-pulse number counted during the feeding of said photographic paper.

13. A method of printing exposed photographic film, comprising the steps of:
(a) storing on a first storage medium frame information containing at least exposure information on and the frame number of exposed photographic film;
(b) synchronously feeding said exposed photographic film and said photographic paper and printing an image from said exposed photographic film onto photographic paper on the basis of said exposure information stored on said first storage medium;
(c) storing on a second storage medium said frame information, said frame information indicating whether it is necessary to print character information on said photographic paper for said printed image, and feeding information as to the amount of said photographic paper which is fed in said step (b) in the printing order of said printed image frame; and
(d) printing a character on said photographic paper on which said image has been printed in response to said information stored on said second storage medium.

14. A method of printing exposed photographic film according to claim 13, further comprising the step of (d) effecting postprocessing while feeding said printed photographic paper under control based on said amount of feeding stored on said second recording medium.

15. A method of printing exposed photographic film according to claim 14, wherein said step (e) includes step (d).

16. A method of printing exposed photographic film according to claim 15, wherein said step (e) is executed on the basis of said frame information stored on said second storage medium in said step (c).

17. A method of printing exposed photographic film according to claim 16, wherein said step (e) includes the inspecting step of (f) inspecting the image printed on said photographic paper before said step (d) has been executed.

18. A method of printing exposed photographic film according to claim 17, wherein said amount of said photographic paper fed in said synchronous feeding and image printing step (b) is counted as a feed-pulse number during image printing step (b) and feed information including said feed-pulse number is stored on said second storage medium in said second information storing step (c).

* * * * *